United States Patent [19]

Krebs et al.

[11] Patent Number: 5,269,576
[45] Date of Patent: Dec. 14, 1993

[54] ADJUSTABLE LENGTH HALLWAY/DOORWAY BRIDGE CARPET STRETCHER ANCHOR AND METHOD OF USE

[76] Inventors: Alex R. Krebs, 820 Taylor St.-Apt. #1, Medford, Oreg. 97504; John B. Wels, Jr., 2895 Mel-Lowe La., Medford, Oreg. 97501

[21] Appl. No.: 856,701

[22] Filed: Mar. 24, 1992

[51] Int. Cl.⁵ .............................. A47G 27/04
[52] U.S. Cl. ........................ 294/8.6; 254/200
[58] Field of Search ............ 294/8.6, 93; 248/351, 248/354.1, 354.6, 354.7; 254/106, 108, 116, 123, 199–212; 296/40; 410/143, 145, 146, 151

[56] References Cited

U.S. PATENT DOCUMENTS

| | | | |
|---|---|---|---|
| 604,987 | 5/1898 | Jansky | 254/206 X |
| 1,952,218 | 3/1934 | Peterson . | |
| 2,631,009 | 3/1953 | Jordan | 254/123 |
| 2,974,931 | 3/1961 | Reel et al. | 410/151 X |
| 3,090,600 | 5/1963 | Smith | 410/151 |
| 3,110,506 | 11/1963 | O'Brien | 410/151 |
| 3,706,440 | 12/1972 | Ross . | |
| 3,747,157 | 7/1973 | Szymanski . | |
| 3,752,440 | 8/1973 | Ream . | |
| 3,880,394 | 4/1975 | Wisecarver | 410/151 X |
| 4,008,879 | 2/1977 | Youngman | 254/201 X |
| 4,023,819 | 5/1977 | Holman | 410/151 |
| 4,230,303 | 10/1980 | Schilz | 254/212 |
| 4,473,331 | 9/1984 | Wisecarver | 410/143 X |
| 4,772,058 | 9/1988 | Andersen | 294/8.6 |
| 4,828,305 | 5/1989 | Gaddy | 294/8.6 |
| 5,183,238 | 2/1993 | Sorensen | 254/200 X |

*Primary Examiner*—Johnny D. Cherry
*Attorney, Agent, or Firm*—Jacobson, Price, Holman & Stern

[57] ABSTRACT

An elongated, longitudinally extendable bridge assembly is provided for bridging between relatively close opposing wall portions with the bridge closely spaced above a flooring extending between the opposing wall portions. The bridge is constructed to withstand heavy lateral loading thereon intermediate the opposite ends thereof and is adapted to have the cross head of one end of an elongated carpet stretcher abutted against one side of the bridge while the head of the carpet stretcher is utilized to engage and stretch carpet extending beneath the bridge in a direction extending outwardly from the side of the bridge against which the cross head of the carpet stretcher is abutted.

4 Claims, 2 Drawing Sheets

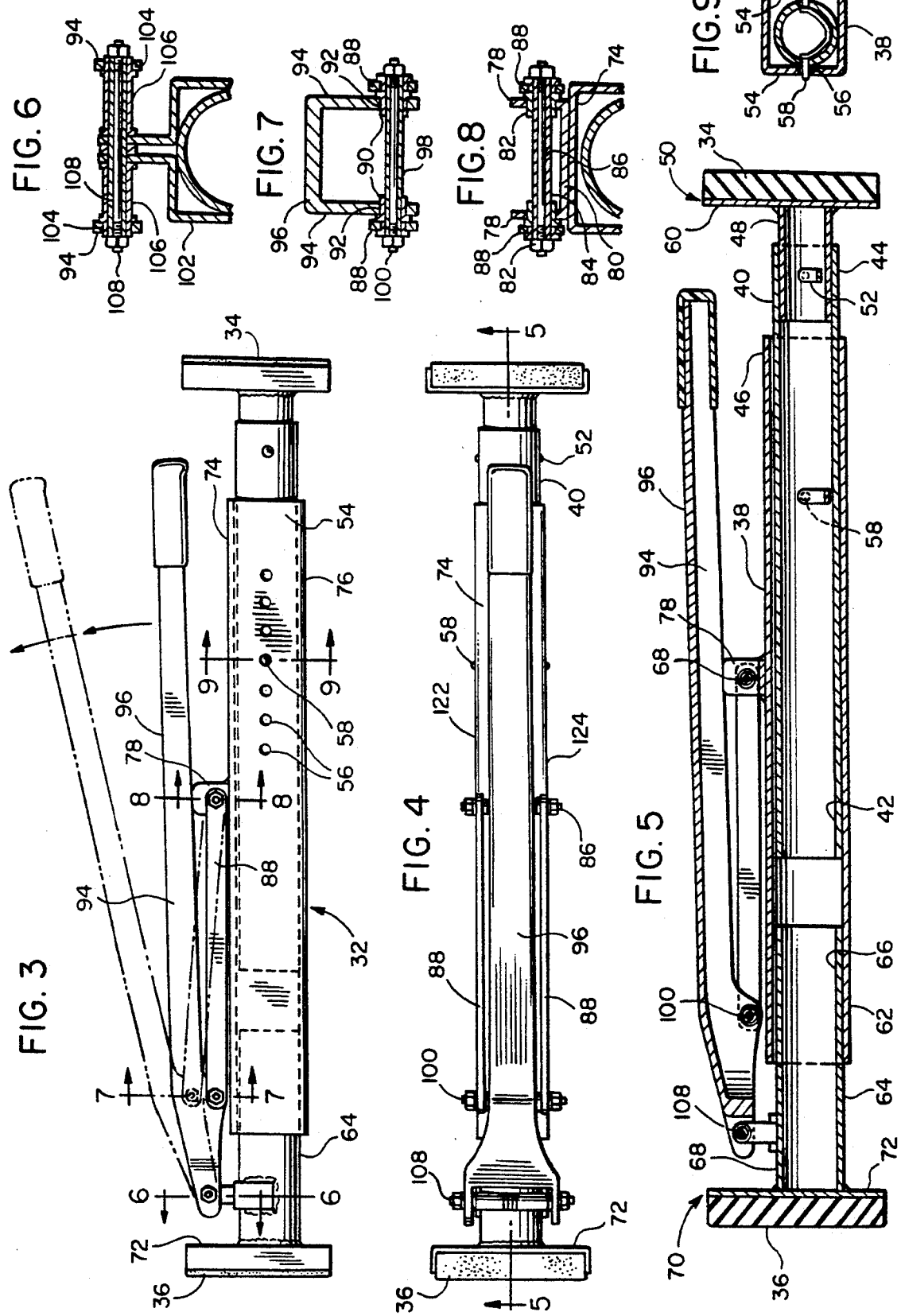

ADJUSTABLE LENGTH HALLWAY/DOORWAY BRIDGE CARPET STRETCHER ANCHOR AND METHOD OF USE

BACKGROUND OF THE INVENTION

1. Field of the Invention

This invention relates to a forcibly extendable, adjustable length elongated bridge for installation between reasonably adjacent opposing wall portions at a level spaced slightly above the level of a floor carpet disposed therebeneath to be stretched in a direction transverse to the bridge and with the latter serving as abutment anchor for one end of a carpet stretcher abutted against a first side of the bridge in position to stretch the carpet extending beneath the bridge in a direction in which the one side of the bridge faces, a remote portion of the carpet to be stretched having a margin thereof floor-anchored on the side of the bridge remote from the stretcher.

2. Description of Related Art

Various different forms of adjustable length and forcibly extendable carpet stretchers heretofore have been provided, but each has been designed primarily as a structure for stretching a length of carpet, the bridge of the instant invention serving as a transverse abutment for one end of an associated carpet stretcher with the bridge forcibly extended between two reasonably adjacent opposing wall portions.

The main object of this invention is to provide a hallway/doorway bridge for installation in a doorway or across a hallway in a manner which enables carpet extending therebeneath to be stretched in either lateral direction from the bridge. By anchoring a first end of a long length of carpet at one end of a hallway and installing the bridge a spaced distance from the other end of the hallway, a relatively short carpet stretcher may be interposed between the bridge and the second end of the length of carpet in order to stretch the same beneath the bridge.

A further object of this invention is to provide a bridge for use as an abutment for one end of a carpet stretcher to thereby eliminate, in most instances, the need for the use of a carpet stretcher in conjunction with several extension sections.

Yet another object of this invention is to provide a bridge useable as an abutment for one end of a carpet stretcher and designed to assist proper stretching of a carpet by a workman in many otherwise difficult carpet stretching operations.

A final object of this invention to be specifically enumerated herein is to provide a hallway/doorway bridge carpet stretcher anchor in accordance with the preceding objects and which will conform to conventional forms of manufacture, be of simple construction and easy to use so as to provide a device that will be economically feasible, long-lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is a side elevational view of the bridge of the instant invention;

FIG. 4 is a top plan view of the bridge;

FIG. 5 is an enlarged longitudinal vertical sectional view taken substantially upon the plane indicated by the section line 5—5 of FIG. 4;

FIG. 6 is a fragmentary enlarged transverse vertical sectional view taken substantially upon the plane indicated by the section line 6—6 of FIG. 3;

FIG. 7 is fragmentary enlarged transverse vertical sectional view taken substantially upon the plane indicated by the section line 7—7 of FIG. 3;

FIG. 8 is a fragmentary enlarged transverse vertical sectional view taken substantially upon the plane indicated by the section line 8—8 of FIG. 3; and FIG. 9 is a slightly enlarged transverse vertical sectional view taken substantially upon the plane indicated by the section line 9—9 of FIG. 3.

DESCRIPTION OF THE PREFERRED EMBODIMENT

Figure 1:
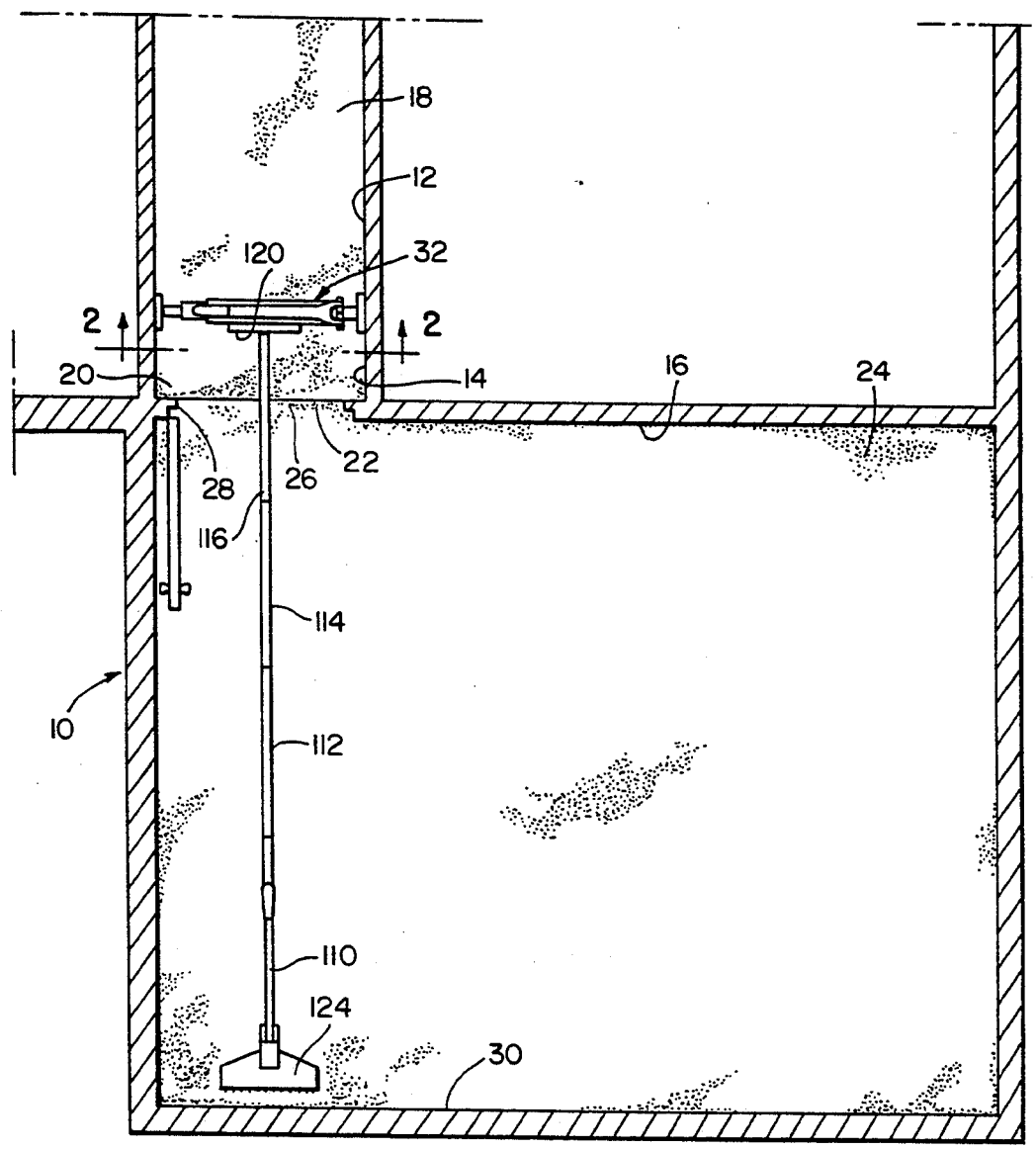
FIG. 1 is a plan view of a typical hallway and hallway end room carpet installation wherein the bridge of the instant invention has been installed between opposing walls of the hallway and is in use as an abutment anchor for one end of a conventional carpet stretcher.

Referring now more specifically to the drawings, the numeral 10 generally designates a typical carpet installation wherein a hallway 12 has one end 14 opening into a room 16. A length of carpet 18 extends down the hallway 12 toward the room 16 and has its end remote from the room 16 already suitably anchored to the floor. Typically, the end 20 of the carpet length 18 adjacent the room is secured to an adjacent edge 22 of a body 24 of carpet disposed in the room 16. In order to properly install the length 18 and the body 24, the seam 26 between the length 18 and the body 24 should extend across the doorway 28 opening into the room 16 from the one end 14 of the hallway 12.

If the hallway 12 is of considerable length (as it is in some instances), it is impossible to obtain a sufficient force to stretch the length 18 and the body 24 of carpet from the far wall 30 of the room 16 all the way down the hall 18 to the other end (not shown) thereof, inasmuch as a carpet stretcher of that length would not be sufficiently resistive of lateral forces acting thereon to prevent it from bowing and ultimately buckling centrally intermediate its opposite ends.

The bridge of the instant invention is referred to in general by the reference numeral 32 and comprises a carpet stretcher-type of device, except that the opposite ends thereof are provided with rigidly backed compression pads 34 and 36 disposed normal to the longitudinal center line of the bridge 32.

The bridge 32 incorporates an elongated, heavy gauge material tubular body 38 which is substantially square in transverse cross section. A first cylindrical extension 40 is provided and includes first and second end portions 42 and 44, the first end portion 42, representing more than one-half of the overall maximum length of said stretcher, adjustably, snugly and slidably telescoped within the body 38. The second end portion 44 projects outwardly of a first end 46 of the body 38 and has a cylindrical mounting shank 48 of a compression pad assembly referred to in general by the reference numeral 50 removably telescopingly received therein, the shank 48 being releasably latched in predetermined position within the second end portion 44 through the utilization of a spring latch assembly 52. In addition, the opposite side walls 54 of the body 38 each have longitudinal rows of spaced apertures 56 formed therethrough and a spring latch assembly 58 corresponding to the spring latch assembly 52 is utilized to secure the first end portion 42 in adjusted telescoped position within the first end 46 of the body 38.

The compression pad assembly 50 incorporates a channel member 60 disposed normal to the longitudinal extent of the bridge 32 and the compression pad 34 is secured within and projects outwardly of the channel member 60.

The body 38 includes a second end 62 in which a second cylindrical extension 64 has one end 66 snugly and slidably telescoped. The other end 68 of the second extension 64 projects outwardly of the second end 62 of the body 38 and has a compression pad assembly referred to in general by the reference numeral 70 supported therefrom. The compression pad assembly 70 is similar to the compression pad assembly 50 in that it includes a channel member 72 supported from the other end 68 of the second extension 64 and disposed normal to the longitudinal extent of the body 38, the compression pad 36 being mounted within the channel member 72 and projecting slightly outwardly thereof.

The top and bottom walls 74 and 76 of the body 38 are substantially horizontal and the bottom wall 76 is spaced above a horizontal plane containing the lower extremities of the compression pad assemblies 50 and 70. Further, opposite side portions of the longitudinal central area of the top wall 74 include a pair of upwardly projecting mounting ear 78 which comprise parallel flanges of a channel shaped bracket having its bight portion 80 suitably secured in any convenient manner to the upper surface of the top wall 74. The mounting ears 78 have aligned and shouldered sleeves 82 received in apertures provided therefor in the ear 78 and a long sleeve 84 has its opposite ends received through the shouldered sleeves 82, a bolt and nut combination 86 being secured through the sleeves 82.

One pair of corresponding ends of a pair of links 88 are pivotally supported from the sleeves 82 and the other pair of ends of the links 88 are pivotally supported from shouldered sleeves 90 passed through apertures 92 formed in downturned opposite side flanges 94 of an elongated lever 96, the sleeves 90 receiving a pivot sleeve 98 therethrough secured in position through a bolt and nut combination 100 secured through the sleeve 98.

Figure 2:
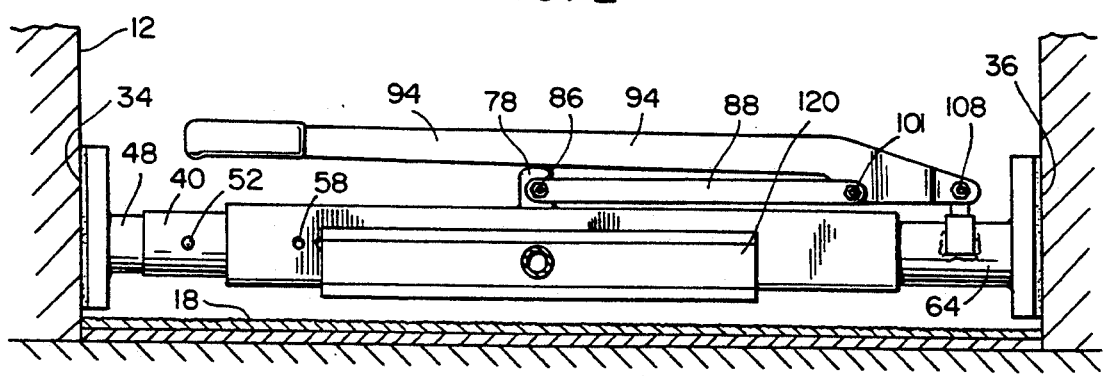
FIG. 2 is an enlarged fragmentary vertical sectional view taken substantially upon the plane indicated by the section line 2—2 of FIG. 1.

In addition, the fulcrum end of the lever 96 has a mount 102 mounted therefrom and the flanges 94 have apertures 104 formed therethrough which receive sleeves 106 therein, the sleeves 106 being carried by a sleeve 108 supported from the bracket 102 and secured in position by a nut and bolt combination 108. Accordingly, the lever 96 may be swung from the slightly over center limit position thereof illustrated in solid lines in FIGS. 2 and 3 (wherein the center of the pivot connection at 100 is slightly below a straight line extending between the centers of the pivot connections 68 and 108) to an upwardly directed position such as that illustrated in phantom lines in FIG. 3 in order to inwardly retract the second extension 64. The side flanges 94 abut the ears 78 as shown in FIG. 3 to limit downward swinging movement of the lever 96 to the slightly over center position thereof illustrated in solid lines in FIG. 3.

As the lever 96 is swung downwardly toward the over center position thereof, the second extension 64 is forcibly extended to increase the distance between the compression pads 34 and 36 and thereby enable the bridge 32 to be tightly secured in position bridging the hallway 12 as shown in FIG. 1 with the bridge 32 slightly elevated relative to the length 18 of carpet.

By utilizing the bridge 32 as illustrated in FIG. 1 of the drawings in combination with a conventional carpet stretcher 110 and conventional extension shaft portions 112, 114 and 116, the length 18 of carpet in the hallway 12 as well as the body 24 of carpet within the room 16 may be stretched the full length of the hallway 12 and the full width of the room 16, all in one operation. Furthermore, the width of the room 16 may be considerably less than the length of the hallway 12 and stretching the length 18 of carpet in the hallway 12 from one end to the other might not even be possible with the stretcher 110 and the extension sections 112, 114 and 116 thereof. Of course, the end of the extension section 116 remote from the stretcher 110 is provided with a cross head 120 of a length greater than one-half the length of the tubular body 38 and the cross head 120 is abutted against the vertical side 122 of the bridge 32 centrally intermediate the opposite ends of the body 38, the opposite side 124 of the bridge 32 also being vertical and useable as an abutment for the cross head 120.

When the length 18 of carpet and the body 24 are being laid, the end of the length 18 from the doorway 28 is anchored relative to the floor and cut at the edge 22 with the edge 22 being spaced slightly from the doorway 28. Then, the edge 22 is secured to the opposing edge of the body 24 in order to form the seam 26 and the bridge 32 is then installed in the manner illustrated in FIG. 1 and the stretcher 110 is utilized to stretch the entire length of carpet from the remote end of the hallway 12 to the head 124 of the stretcher 110 engaged with the body 24 of carpet opposing the wall 30 of the room 16. In this manner, the full length of carpet is evenly stretched and may be secured at the wall 30. Thereafter, the remainder of the body 24 of carpet within the room 16 may be stretched and secured to the floor.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A bridge for use in connection with an adjustable length carpet stretcher, said bridge including an elongated, heavy gauge material tubular body, generally square in transverse cross section and having first and second ends, a first cylindrical tubular extension including first and second end portions and having said first end portion, representing over one-half the maximum length of said stretcher, snugly and slidably telescoped into said first end, said first end and said first end portion including coacting latch means operative to releasably secure said first end portion in selected telescoped positions relative to said first end with said second end portion projecting outwardly of said first end, a second elongated cylindrical tubular extension having opposite ends, one of said opposite ends being snugly and slidably telescoped into said second end with the other end of said second extension projecting outwardly of said second end, elongated over center limit position lever means operatively connected between said second extension and said tubular body operative to shift said second extension between retracted and extended positions relative to said second end and to forcibly extend said second extension toward said extended position when said lever means is moved toward the over center limit position thereof, said second end portion and said other end including rigidly backed resilient compression pad means supported therefrom in parallel planes disposed generally normal to the lengthwise dimension of said body.

2. The bridge of claim 1 wherein said rigidly backed resilient compression pad means is removably supported from said second end of said first tubular extension member.

3. The bridge of claim 1 wherein said tubular body includes substantially vertical, planar opposite side external surfaces and generally horizontal top and bottom surfaces, said lever means including an operating lever mounted from said tubular body for swinging vertically toward and away from said top surface during movement toward and away from said over center limit position, respectively.

4. The method of stretching a length of carpet having a portion thereof passing between opposing wall portions spaced from one margin of said length of carpet and wherein said one margin is floor anchored, said method including providing an elongated, lengthwise extendable bridge assembly having opposite ends and adapted to withstand considerable horizontal lateral loading centrally intermediate its opposite ends, positioning said bridge assembly lengthwise between said wall portions with said bridge assembly closely spaced above said carpet, extending said bridge assembly into tight lengthwise compression-resisting condition between said wall portions, providing an elongated longitudinally extendable carpet stretcher, positioning said carpet stretcher between said bridge assembly centrally intermediate its opposite ends with one end of said carpet stretcher abutting said bridge assembly, and the other end of said carpet stretcher engaged with the portion of said carpet length disposed on the side of said bridge assembly remote said one margin, extending said carpet stretcher to stretch said length of carpet in a direction extending away from said one margin, and floor anchoring the margin of said length of carpet opposite said one margin.

* * * * *